United States Patent
Lau

(10) Patent No.: US 9,739,595 B2
(45) Date of Patent: Aug. 22, 2017

(54) MULTI-DIMENSIONAL MEASURING SYSTEM WITH MEASURING INSTRUMENT HAVING 360° ANGULAR WORKING RANGE

(75) Inventor: Kam C. Lau, Potomac, MD (US)

(73) Assignee: Automated Precision Inc., Rockville, MD (US)

( * ) Notice: Subject to any disclaimer, the term of this patent is extended or adjusted under 35 U.S.C. 154(b) by 0 days.

(21) Appl. No.: 12/654,073

(22) Filed: Dec. 9, 2009

(65) Prior Publication Data

US 2010/0149525 A1 Jun. 17, 2010

Related U.S. Application Data

(60) Provisional application No. 61/193,618, filed on Dec. 11, 2008.

(51) Int. Cl.
| | |
|---|---|
| *G01B 11/00* | (2006.01) |
| *G01C 15/00* | (2006.01) |
| *G01S 17/42* | (2006.01) |

(52) U.S. Cl.
CPC .......... *G01B 11/002* (2013.01); *G01C 15/002* (2013.01); *G01S 17/42* (2013.01)

(58) Field of Classification Search
CPC .............. G01C 3/08; G01C 5/00; G01C 3/00
USPC ............ 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 6,611,617 B1* | 8/2003 | Crampton .......... | G01B 11/2518 356/614 |
| 2002/0027651 A1* | 3/2002 | Jackson et al. .......... | 356/139.09 |
| 2005/0151963 A1* | 7/2005 | Pulla .................... | G01B 21/04 356/139.03 |

(Continued)

*Primary Examiner* — Luke Ratcliffe
(74) *Attorney, Agent, or Firm* — Stephen F. K. Yee, LLC; Stephen F. K. Yee

(57) ABSTRACT

A multi-dimensional measuring system is disclosed wherein a laser-based tracking unit communicates with an optical target on a measurement instrument to obtain position and orientation information about the instrument. The optical target incorporates a plurality of encoders configured to provide a full 360° working range in pitch, yaw and roll. Full working range in pitch and yaw is achieved through the use of a pitch/yaw angular encoder. Full 360° working range in roll is achieved with a combination of a level sensor and a 360° angular encoder, which are fixed to a pendulum so that the level sensor is always aligned to gravity. Use of a slip-ring mechanism ensures the unlimited full working range in roll. The measurement instrument includes a scanner integrated with a probe receptacle adapted to accept a probe assembly to provide the instrument with both a scanning measurement and a probe measurement capabilities. Incorporation of an additional probe receptacle provides increased measurement capability and flexibility. The optical target with its full 360° angular working range in pitch, yaw and roll can be utilized independently of the measurement instrument. In combination with a laser tracker, the optical target can be attached to any object or surface to be measured, or alternatively, it can be attached to a movable device and the position of that device monitored.

10 Claims, 4 Drawing Sheets

(56) References Cited

U.S. PATENT DOCUMENTS

2009/0177438 A1* 7/2009 Raab .................... G01B 21/04
                                                                                    702/152

* cited by examiner

MULTI-DIMENSIONAL MEASURING SYSTEM WITH MEASURING INSTRUMENT HAVING 360° ANGULAR WORKING RANGE

The present application claims priority benefit of U.S. Provisional Application No. 61/193,618, entitled Multi-dimensional Measuring System with Measuring Instrument Having 360° Angular Working Range, filed Dec. 11, 2008.

BACKGROUND OF THE INVENTION

Field of the Invention

The present invention relates generally to a measuring system. In particular, the invention relates to a multi-dimensional laser tracking system for measuring target orientation. More particularly, the systems and methods of this invention relate to a target, or end-effector, for a laser tracking system with a 360° angular working range and capable of precise and large scale point and line surface measurements. The invention further relates to an angular measurement sensor having full 360° angular working range.

Related Art

Precision measuring systems have a wide variety of applications. In robotics, for example, accurate positioning and orientation of a robot is often required. To achieve a high degree of precision, a robot position measuring system can be used. Such a system typically uses a laser beam interferometer to determine the position and/or orientation of a target, or an end-effector, attached to the robot. This system can monitor the position and orientation of the robot end-effector in real-time while providing accuracy, speed and measurement data.

For example, a Three and Five Axis Laser Tracking System is discussed in Applicant's U.S. Pat. No. 4,714,339 and a Five-Axis/Six-Axis Laser Measuring System is discussed in Applicant's U.S. Pat. No. 6,049,377, both of which are incorporated herein by reference in their entirety. Additionally, a Multi-Dimensional Measuring System is discussed in Applicant's U.S. Pat. No. 7,230,689 and U.S. application Ser. No. 11/761,147 and Ser. No. 11/870,666, which are also incorporated herein by reference in their entirety to provide additional description for the present invention. An Accurate Target Orientation Measuring System is discussed in Applicant's U.S. Pat. No. 7,400,416, which also is incorporated herein by reference in its entirety.

Touch-type probes and optical scanners are two types of sensors commonly used with the target, or end-effector, of a laser tracking system to obtain measurements of an object or surface of interest. Probes provide measurement of a point or multiple points with a high level of accuracy while scanners provide for rapid measurement of multiple points. Each type of sensor provides advantages dependent upon its application.

In U.S. Pat. No. 7,230,689, Applicant describes a probe assembly affixed to an active target for a laser tracking system which provides for measurement of a point which is not in the line-of-sight of the tracking unit, or, alternatively, the point to be measured is inaccessible by the target. The disclosed device permits, for example, the rapid measurement of deep recesses and hidden points on large structures and parts with high accuracy. Using interchangeable probes, an operator can change probe size, probe angle or probe orientation at any time to better access a measured surface. Measurements of hidden points, detailed features and deep recesses can be obtained which cannot be measured with traditional laser tracker tools.

The touch probe assembly described in Applicant's aforesaid patent, as well as other probes of known design, have an angular working range which is limited by the acceptance angle of the retro-reflector on the target. This working range generally is ±35° in pitch, yaw and roll. For extended working range, the probe has to be re-configured, generally with another probe having a different configuration, and re-calibrated each time. With other probes of known design, the target and probe have to be re-oriented and re-calibrated before additional measurements can be made.

There are many situations which require the accuracy and measuring capability provided by a point-type probing device and the speed provided by a scanning measurement device. Up to now, a separate measurement device was required to use each type of sensor. A capability of quickly changing from a probing device to a scanning device would increase the accuracy of the measurements and greatly enhance the speed with which measurements are made. These advantageous features could further be enhanced if the angular working range of the measurement device could be extended beyond the customary ±35° limit without the requirement of re-configuring and re-calibrating the device.

SUMMARY OF THE INVENTION

The present invention provides a measurement instrument which integrates into a single instrument the point measuring capability of a probe and the line scanning measuring capability of a scanner. By incorporating encoders with the pitch, yaw and roll sensors the instrument is capable of obtaining measurements over the full 360° of motion about each axis of movement, in both probe and scanner modes of measurement. Combined with a laser tracking unit, the measurement instrument of the present invention provides a multi-dimensional measuring system capable of precise and large scale point and line and three-dimensional coordinate measurements.

The invention provides a portable measurement instrument for use with a laser tracking unit, particularly adapted for hand-held manipulation and having the integrated capabilities of probing measurement and scanning measurement, and the flexibility of selective measurement between a probe and a scanner.

The invention also provides a portable, hand-held measurement instrument having the integrated capability of selective probing or scanning measurement, wherein the measuring probe can be connected in alternate positions on the instrument for expanded measurement capabilities.

The present invention also provides an optical sensor capable of angular measurements with full 360° of movement about each of the coordinate axes.

The apparatuses and methods of this invention employ a combination of a tracking unit and a measurement instrument which integrates the capabilities of a point probing measurement device and a line scanning measurement device. The measurement instrument includes an optical active target assembly which provides full 360° angular range of motion of the instrument about each of the coordinate axes. Combined with a laser tracking unit, the measurement instrument is capable of precise and large scale point and line and three-dimensional coordinate measurements. The laser tracking unit tracks the measurement instrument and determines its spatial position. The optical target assembly has pitch, yaw and roll sensors which permit determination of the relative orientation of the measurement instrument to the tracking unit. The combined measurement data from the tracking unit and the measurement instrument determine the final probing or scanning positions.

The laser tracker unit tracks the optical target of the measurement unit and calculates and reports the precise position of the target in a pre-defined three-dimensional coordinate system. The optical target assembly includes a retro-reflector with an aperture at its apex to allow a small portion of the tracker laser beam to pass through. A position-sensitive detector, or the pitch and yaw sensor, is disposed behind the aperture to receive the laser beam passing through and detects the relative pitch and yaw position between the tracker and the retro-reflector, and hence the measurement device. As an alternative embodiment, the position sensitive detector may be replaced with a smart digital imaging sensor which has its own image processing and computation capabilities.

The pitch and yaw working range of the optical target is expanded to 360° with the use of a pitch/yaw range expansion encoder. The roll sensor of the measurement instrument has an unlimited 360° working range achieved with a combination of a level sensor and a 360° angular encoder, both being fixed to a pendulum so that the level sensor's primary sensitive direction is always aligned to gravity. A slip-ring mechanism supports the level sensor and angular encoder to provide full, unlimited working range in roll. The level sensor has a second pendulum to level the non-measuring axis of the sensor to eliminate crosstalk. Readout from the angular encoder and output from the level sensor are synchronized to achieve dynamic accuracies.

The measurement instrument includes a scanner and a probe-receiving receptacle adapted to accept a probe assembly to provide the instrument with both scanning measurement and probe measurement capabilities. Precise and large scale point and/or line and three-dimensional coordinate measurements are possible. Measurements of locations not within the line of sight between the tracking unit and the instrument are easily made. Incorporation of an additional probe-receiving receptacle provides increased measurement capability and flexibility. When the instrument is configured for probing measurement, a detachable probe can be connected in either of two different positions for expanded measurement capabilities. The two probe receptacles accept a wide range of probes. Automatic probe identification is possible. When the instrument is to be configured for scanning measurement, it is only necessary to disconnect the probe and turn on a scanning laser source. The measurement instrument has a positioning beam that helps to position the scanner at an optimal distance to the object to be measured.

An important feature of the apparatus is the ability of the measurement instrument to measure points which are not visible from the tracking unit. In general, measuring systems based on camera or laser distance measuring have a weakness in that points which are not visible cannot be measured. When using the present measurement instrument, a clear line of sight from the tracking unit to the optical target is required. However, a clear line of sight to the contact point is not required.

The optical target with its full 360° angular working range in pitch, yaw and roll can be utilized independently of the probe-and-scanner handle assembly. In combination with a laser tracker, the optical target can be attached to any object or surface to be measured. Alternatively, the optical target can be attached to a movable device and the position of that device monitored.

The novel features and advantages of embodiments of the present invention will be better understood from the following description considered in conjunction with the accompanying drawings wherein like reference numbers designate like elements throughout, and primed reference numbers are used to indicate similar elements in alternate embodiments. It should be expressly understood, however, that the drawings are for purposes of illustration and description only and are not intended as a definition of the limits of the invention.

DETAILED DESCRIPTION OF THE PREFERRED EMBODIMENTS

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art.

Figure 1:
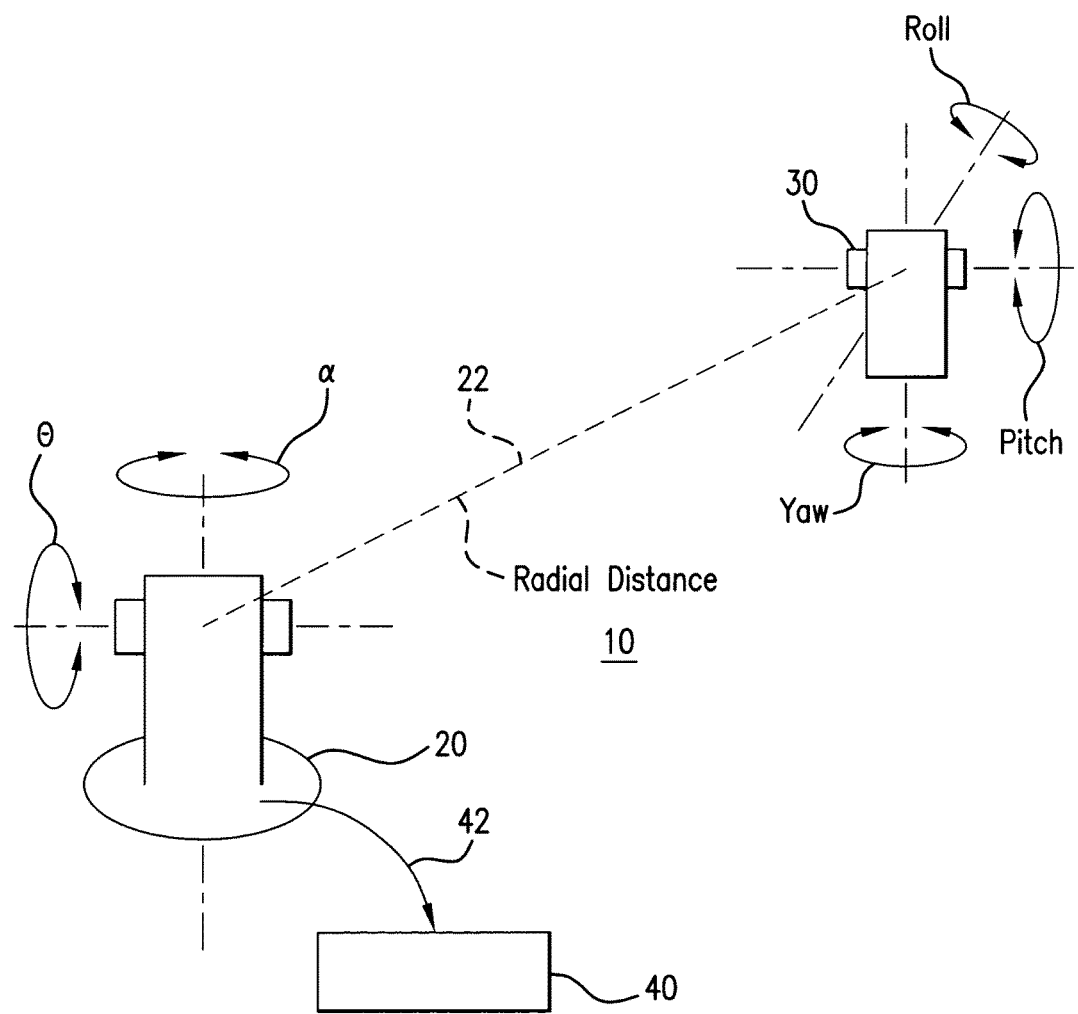
FIG. 1 illustrates a laser tracking system in which the present invention may be incorporated.

FIG. 1 illustrates an exemplary multi-dimensional laser tracking system in which the measurement instrument of the present invention may be incorporated. Laser tracking system 10 comprises a laser tracking unit 20 and a target 30. The tracking unit 20 emits one or more laser beams 22 which communicate with the target 30 to determine the six dimensional measurements associated with the target, which are output on a control unit 40. The six dimensions illustrated in FIG. 1 are pitch, yaw and roll of the target 30, the spherical ($\alpha$, $\theta$) and once converted the Cartesian, coordinates of the target relative to tracking unit 20, and the radial distance between the tracking unit and the target.

Determination of the pitch, yaw and spherical coordinate measurements can be based on various technologies. For example, the pitch and yaw measurements can be derived from information provided by one or more photodetectors on the optical target. A rotary encoder could also be used to provide the information for determining the pitch and yaw measurements. The roll measurements can be based, for example, on a polarization or an electronic level technique. More particularly, the roll measurements can be based on the novel technique of the present invention, as more fully described hereinafter.

The distance measurements between the tracking unit 20 and the target 30 can be accomplished using known techniques, such as, for example, a pulsed laser configuration, repetitive time of flight pulses, phase/intensity modulation of the laser beam, or the like. These various techniques can provide absolute ranging of the target. Thus, the target does not have to be returned to a known position, such as with an interferometer, before distance measurements can commence. An absolute distance measurement technique can also be used to determine the initial distance, and then an interferometer-based technique used for distance measurement.

Tracking unit 20 and target 30 illustratively can be motorized units which allow one or more portions of the tracking unit and target to maintain a perpendicular orientation to incoming laser beams 22 emitted from the tracking unit. Tracking unit 20 is the source of the laser radiation and target 30 is an active target. Through a combination of rotary encoders and motors (not shown in the drawings) that employ position signals from one or more position sensors, as discussed below, target 30 is capable of remaining perpendicular to incoming laser beams 22. Thus, for example, with the use of a gimbal-type mount and corresponding positioning motors, such as stepping motors, servo motors and/or encoders, target 30 is able to track the tracking unit 20. Based upon the relationship of target 30 to the incoming laser beams 22, the tracking system 10 is able to determine the orientation of the target.

While proper functioning of tracking system requires that tracking unit 20 and target 30 operate to maintain a direct line of sight between these elements, a line of sight is not necessary for the measurement instrument of the present invention to make the desired measurements. As described more fully below, this capability permits the measurement instrument to measure hidden points, hidden structures, deep recesses, and the like, with high accuracy. By "hidden" it is meant that the points, lines, surfaces, features, and the like, are not directly illuminated by the incoming laser beams.

The control unit 40, connected to the tracking unit 20 or the target 30 or both, via a link 42, which may be a wired link or a wireless link, outputs the position information about the target 30. The control unit 40 also provides functional and measurement control, data capture, processing, computation and other functions. As illustrative examples, control unit 40 can be a computer, a feedback input for a position control device, a display, a guidance system, or the like. In general, the control unit 40 may be any device capable of outputting information on the target's position.

One or more of the laser beams 22 can be used to communicate position information about the target 30 back to the tracking unit 20. Thus, for example, after an initial distance is determined, the laser beam used for the absolute distance measurement can be used for data communication and the interferometer-based laser used for the radial distance measurements. Alternatively, a dedicated laser can be incorporated into the system that would allow full time communication between the target and the tracking unit. The tracking unit 20 is capable of being miniaturized by incorporating both the absolute distance measurement and the interferometer electronics, for example, in the gimbaled portion of the tracking unit. This provides certain advantages, such as reduced weight, reduced size, minimization of external connections, quicker tracking speeds, and the like.

Figure 2:
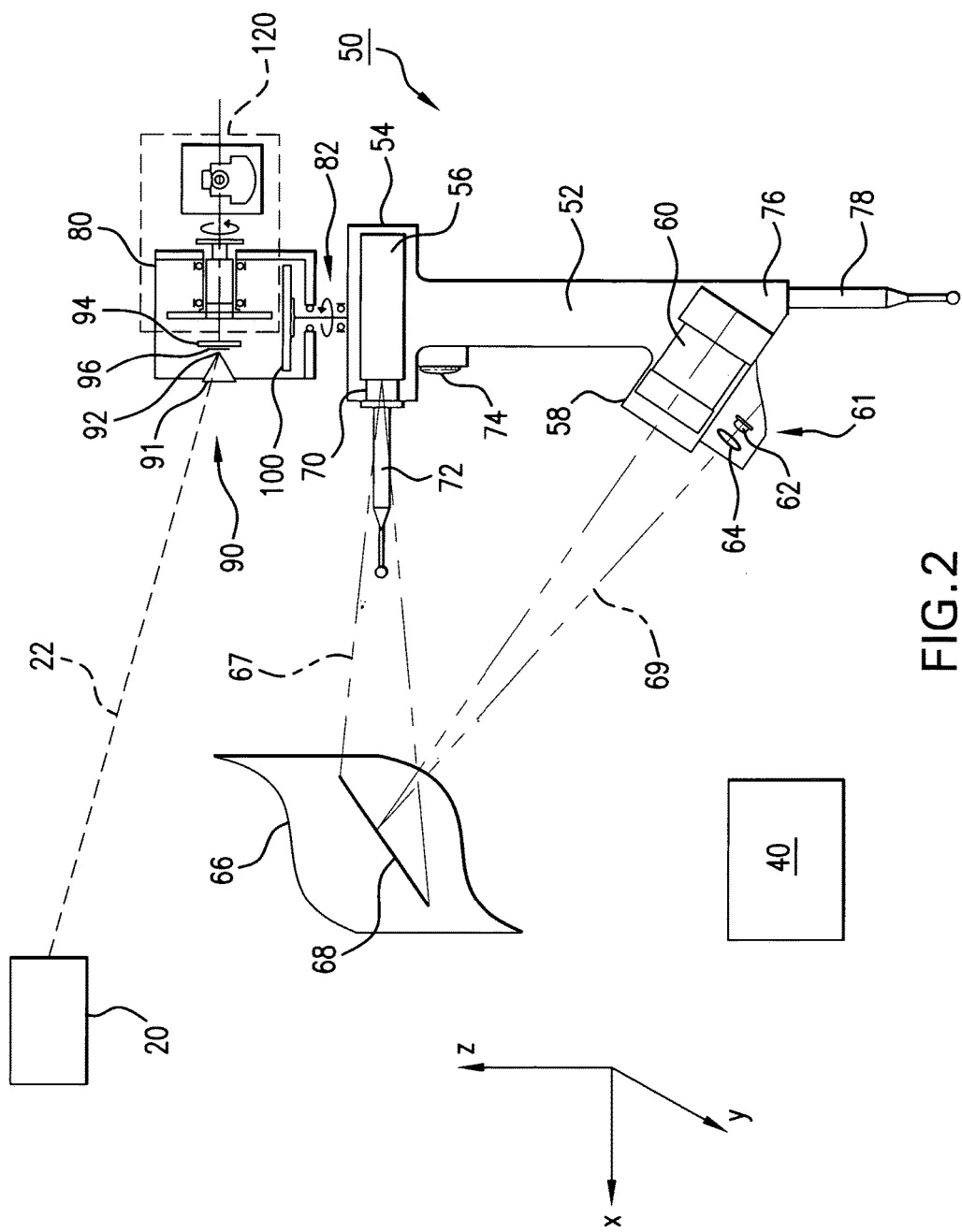
FIG. 2 is a schematic illustration of an embodiment of the measurement instrument of the present invention.

An embodiment of the measurement instrument 50 of the present invention, as shown schematically in FIG. 2, preferably configured as a portable, hand-held device, includes an elongated, central portion forming a handle assembly 52 for manipulating the instrument. At one end of handle assembly 52, the upper end as seen in FIG. 2, is a compartment 54 for receiving a scanner laser 56. Disposed at the other end of handle assembly 52 is a housing 58 for a scanner camera 60. The housing 58 is configured at an upwardly-inclined angle with respect to the longitudinal axis of handle assembly 52. Received within an external extension of housing 58 is an optical guide means 61 which includes a light source 62 and a lens 64 positioned adjacent to and downstream from the light source. The scanner laser 56, scanner camera 60, and optical guide means 61 cooperatively function to provide the scanner mode capability for making measurements with the instrument 50, as will be more fully described hereinafter. The scanner laser 56 and scanner camera 60 may be of known or later-developed design.

In an alternative embodiment, the scanner housing 58 for the scanner camera 60 can be pivotally coupled to the handle assembly 52 of the instrument, to permit adjustment of the inclination angle. This would provide increased flexibility in orienting the camera.

Hereafter in the description, the terms measurement instrument and instrument are used interchangeably to refer to the measurement instrument 50 of the present invention.

The representation of the coordinate axes in FIG. 2 is schematic only. The y-axis extends perpendicularly to the plane of the page, and the orthogonal x- and z-axes are within the plane of the page.

One end of scanner laser compartment 54 is closed, such as the right end shown in FIG. 2. The opposite end of compartment 54 is open, but is capped with a suitable lens (not shown) of known design to permit passage of the laser beam from scanner laser 56. The region of the compartment 54 receiving the capping lens is provided with a first probe-receiving receptacle 70 configured to securely but removably receive a contact-type measurement sensor such as touch probe 72. Preferably, first probe receptacle 70 is formed in a forward extension of compartment 54. Disposed on handle assembly 52, in a convenient location adjacent to compartment 54, is a trigger button 74 which, when depressed, is adapted to activate the instrument 50 for making measurements.

By way of example only, first probe receptacle 70 can be configured as a cylindrical recess provided with screw threads on its inner cylindrical surface. Configured in this manner, the threaded inner surface of first probe receptacle 70 can receive the similarly-threaded end portion (not shown) of probe 72 to quickly and securely attach the probe to the instrument 50, and at the same time permit the fast removal of the probe from the instrument.

It is understood and would be apparent to one having skill in the art that other configurations of coupling means could be provided for the rapid, secure attachment and quick removal of a probe from the measurement instrument 50. An example of another suitable configuration is a quick-lock bayonet type connection commonly found on photographic cameras with interchangeable lens. A thumb screw arrangement also may be a suitable coupling means, as well as the use of a wing nut and associated locking teeth.

Alternatively, the first probe-receiving receptacle can be positioned at a different location on handle assembly 52, such as just below scanner laser compartment 54. Incorporating first probe-receiving receptacle 70 with scanner laser compartment 54 affords a more compact design and reduced weight for the instrument 50, both factors contributing to the portability, maneuverability and ease of use of the instrument.

To further expand its measurement capabilities, instrument 50 optionally can be provided with a second probe-receiving receptacle 76 positioned, for example, at the lower end of handle assembly 52 in the view of FIG. 2. Second probe receptacle 76 is configured the same as first probe receptacle 70 to permit attachment of probe 72 in either the first or second probe receptacle. Alternatively, the provision of second probe receptacle 76 permits the mounting at the same time of a second probe 78, resulting in greater flexibility in making measurements. With this arrangement, the first probe and second probe may be of the same configuration or be of different configurations, depending upon the requirements of the measurement session.

The probe receptacles accept a wide range of probes which may be of known design or later-developed design. The probes illustratively may be of the direct contact type whereby when a measurement associated with a location touched by the probe tip is to be taken, the trigger 74 is depressed. The probe may be of the touch-sensitive type whereby a measurement is made when the probe tip comes into contact with the location to be measured. With these probe types, the contact is a physical contact. Alternatively, the contact can be effected when the probe tip only has to be in close proximity with the location to achieve the measurement. Such non-physical contact can be accomplished by using, as examples, magnetic or infrared devices associated with the probe tip.

It can be appreciated that with the design of the present invention probes of different sizes and having different configurations and/or tip shapes can be rapidly changed depending upon the application requirements of the measurement session. Reference can be had to Applicant's U.S. Pat. No. 7,230,689 for descriptions of example probe configurations which can be employed with the measurement instrument of the present invention.

The capability of automatic probe identification further increases the flexibility and ease of use of the measurement instrument. Each probe can be provided with identification means which can be used manually or automatically to identify the probe to the control unit. A unique identifier, such as a series of numbers and/or letters, can be provided visually on the body of the probe. After attaching the probe to the desired probe receptacle, the operator manually enters the identifier into the control unit. The geometry of the probe and other information relating to the making of measurements with the specific probe, are then retrieved from a database stored, for example, in the control unit. This information is used by the control unit in calculating measurements made with the probe.

Alternatively, each probe can be provided with a unique identifier stored in a machine-readable form, such as a chip embedded in the base portion of the probe. As noted above, the identifier can be a series of numbers and/or letters. The probe identifier is read by a suitable reader provided in the probe receptacle or otherwise in the handle assembly, and used to retrieve the relevant information from a database stored in the control unit which is used in calculating the measurements made with the probe. Optionally, all information for the probe can be stored on the chip, read by the reader, and uploaded to the control unit when the probe is attached to the probe receptacle. The chip may be of the type commonly used in automotive ignition keys to deter theft. Other suitable existing or later-developed identification means and data storage means are comprehended within the scope of the present invention.

To configure the instrument 50 for probing operation, an appropriate probe 72 is selected and attached to the desired probe receptacle 70 or 76. The probe identifier is provided to the control unit 40, either manually by the operator or automatically upon attachment of the probe to the receptacle as described above. The probe is initialized for measurement by using any known or later-developed technique. Reference is made to Applicant's U.S. Patent for discussions of initialization techniques which may be used with the present invention. Depressing trigger button 74 activates the instrument 50 for probing measurement which is accomplished by touching the probe tip to the point on the object or location to be measured.

It may be desirable during the measurement session to switch the probe from the receptacle being used, to the other probe receptacle. This switch may be dictated by access, or lack of ready access, to the point to be measured. The geometry and/or configuration of the object to be measured also may require switching the probe from one receptacle to the other. In this situation, it is a simple matter for the operator to detach the probe from the receptacle in use and attach it to the other receptacle. After initialization of the probe, the instrument is ready for continued measurement.

Optionally, if it is desired to install two probes at the same time, the desired probes are selected and attached to each of the probe receptacles. The respective probes are identified to the control unit 40, and after initialization of each probe, the instrument is ready for taking measurements. The control unit has to be properly instructed to work with each probe. The configurations of the probes may be the same or be different, depending upon the requirements of the measurement session.

With the configuration of the probe receptacles on the handle assembly described above, an operator can change probe size (length), change probe angle, change probe tip design or change probe orientation at any time to better access a measured surface. It then is possible for the operator to perform rapid measurements of locations which are difficult to access with high accuracy, such as hidden points, detailed features and deep recesses which otherwise cannot be measured with traditional tracking measurement tools.

To configure the measurement instrument 50 for scanning measurement, any probe attached to a probe receptacle is disconnected and removed. Scanner laser 56 may be turned on with a switch (not shown) after probe removal, or it may remain on continuously from the beginning and during a measurement session, to illuminate the object 66 to be measured with a fan-shaped laser beam 67 to create a projected laser line 68 on the object or surface 66. Alternatively, scanner laser 56 can be activated by the removal of a probe from its receiving probe receptacle. At the same time, scanner camera 60 is activated and light source 62 energized to project an instrument positioning beam 69 toward object 66. Optimal positioning of the measurement instrument 50 relative to object 66 can be achieved by use of optical guide means 61. Since projected laser line 68 and scanner positioning beam 69 are both visible, optimal separation distance between the measurement instrument 50 and the location to be measured can be achieved by moving the instrument closer to or further from object 66, until the positioning beam 69 just touches the projected line 68. By maintaining this alignment, the optimal separation distance can be maintained throughout the scanning session.

The laser beams from scanning laser 56 are reflected from object 66 and captured by scanner camera 60. The data received by scanner camera 60 subsequently is transmitted to the control unit 40 where it is processed, stored and output as needed.

When it is desired or necessary to continue measurements with a probe, the operator merely has to mount the selected probe in the desired probe receptacle. The measurement instrument optionally can be configured such that the scanner mode is automatically turned off upon attachment of the probe.

While not specifically shown in the drawings, the measurement instrument can be provided with status indicators to indicate the operative status of the instrument in the probing mode and the scanning mode, respectively. Such indicators can be embodied as indicator lights positioned on the device at locations readily observable by the operator. By way of example only, one or more indicator lights can be positioned on the top of the measurement instrument to indicate the operative status of the instrument while in the probing mode. One or more additional indicator lights can be positioned on the back of the scanner laser compartment to indicate the operative status while the instrument is in the scanning mode.

A mechanism which provides instrument 50 with full 360 degree angular working range about the pitch, yaw and roll axes is disposed at the upper end of handle assembly 52, as seen in the orientation of FIG. 2, above scanner laser compartment 54. The mechanism, which will be referred to as optical target 90, exemplarily is contained within a housing 80, includes a reflector 91, a laser light sensor 94, a pitch/yaw encoder 100 and a roll sensor module 120. Housing 80 is rotatably coupled to handle assembly 52 adjacent to scanner laser compartment 54 by suitable rotary coupling means 82 to permit wide-angle rotation about the z-axis of the housing, independently of the scanner laser compartment. This rotational capability permits easy orientation of optical target 90 toward the laser tracking unit 20. Use of a slip ring is one example which would permit this unlimited 360 degree rotation of housing 80.

The reflector 91 may be a retro-reflector which is modified with an aperture 92 at its apex to allow a small portion of laser beam 22 to pass through. Laser light sensor 94, or the pitch and yaw sensor, is positioned behind aperture 92 to receive the small portion of laser beam 22. Disposed between aperture 92 and laser light sensor 94 is a filter/attenuator 96 which filters and attenuates the portion of the laser beam passing to the sensor and also reduces the influence of any ambient light incident onto the sensor. Laser light sensor 94 is used in determining the orientation of optical target 90 relative to the pitch and yaw axes, and hence of the measurement instrument 50 to which the optical target is attached. An exemplary technique for determining this orientation is described with reference to FIG. 3.

Laser light sensor 94 preferably is configured as a planar detector which, for example, can be a charge coupled device (CCD) or a CMOS-type camera of known design, both of which are configured to produce a 2-dimensional image based on light intensity incident as a function of position on the laser light sensor. Alternatively, the laser light sensor may include an analog position-sensitive detector of known design. An amplifier/repeater can be associated with the laser light sensor to amplify analog signals or digital signals produced by laser light sensor. Further, an illustrative alternative embodiment of the laser light sensor of the present invention may use a smart digital imaging sensor which has its own image processing/computation capabilities in place of the position sensitive detector.

A pitch/yaw encoder 100 is disposed substantially parallel to the x-axis and functions cooperatively with laser light sensor 94 to expand the working range of pitch and yaw movements to a full 360°. Automatic pitch/yaw angle transformation is performed when the measurement instrument 50 is rotated. More specifically, when instrument 50 is rotated 90 degrees in one direction or the other about the x-axis, as an example, the identity of the pitch axis and the yaw axis are effectively interchanged. In the changed orientation, movement of the instrument 50 with respect to the interchanged axes is automatically transformed.

Figure 3:
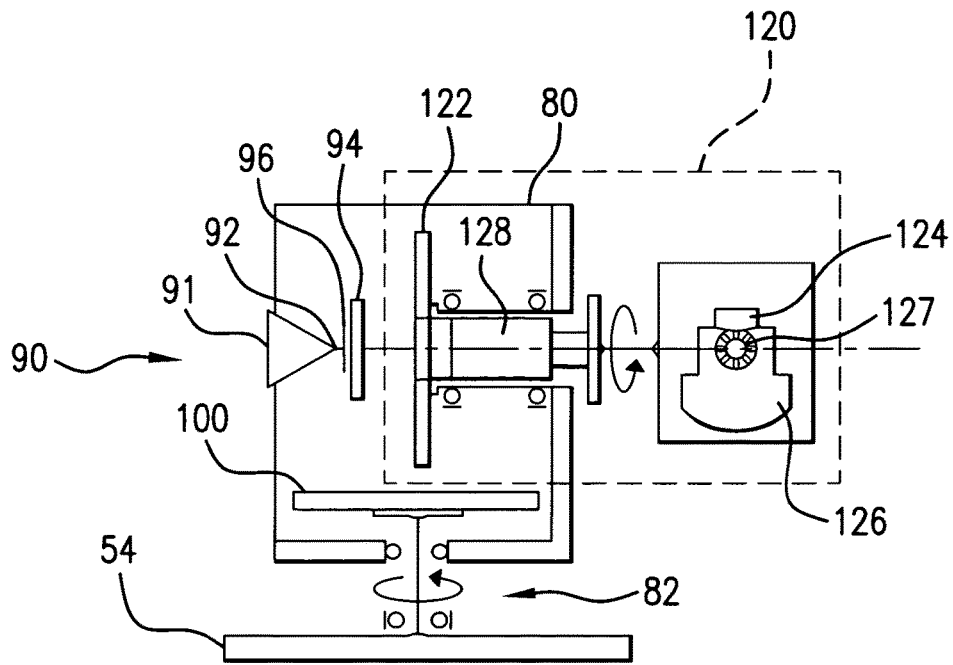
FIG. 3 is a schematic diagram, to an enlarged scale, of the roll sensor module shown in FIG. 2.

As shown in FIG. 3, a roll sensor module 120 includes a 360° roll sensor or roll angle encoder 122 and roll level sensor 124, both coupled to a two-dimensional pendulum 126 so that the roll level sensor is always aligned to gravity. Roll angle encoder 122 and roll level sensor 124 are interconnected by a slip-ring 128 to provide measurement instrument 50 full 360° rotational working range in roll (rotation about the x-axis). The accurate roll angle is derived from roll angle encoder 122 and roll level sensor 124.

Pendulum 126, in addition to being rotatably supported about the roll axis, also is rotatably supported on a pitch shaft 127 oriented parallel to the y-axis, such that the pendulum remains aligned with gravity as the measurement instrument 50 moves in pitch (rotation about the y-axis). Thusly configured, pendulum 126 functions to level the non-measuring axis of roll level sensor 124 to eliminate crosstalk. The readout from roll angle encoder 122 and the output from roll level sensor 124 are synchronized to achieve dynamic accuracies.

The encoders may be replaced with other angle detection sensors of known design or later-developed design. As examples only, sensors such as rotary voltage differential transformers (RVDT) and Hirth couplings which use meshing gears with high precision and repeatability may be used.

It is comprehended within the scope of the present invention that any suitable means of known design or later-developed design can be used with the mechanism to determine movement of the measurement instrument in pitch and yaw. An illustrative example of a suitable means is shown schematically in FIG. 4.

Figure 4:
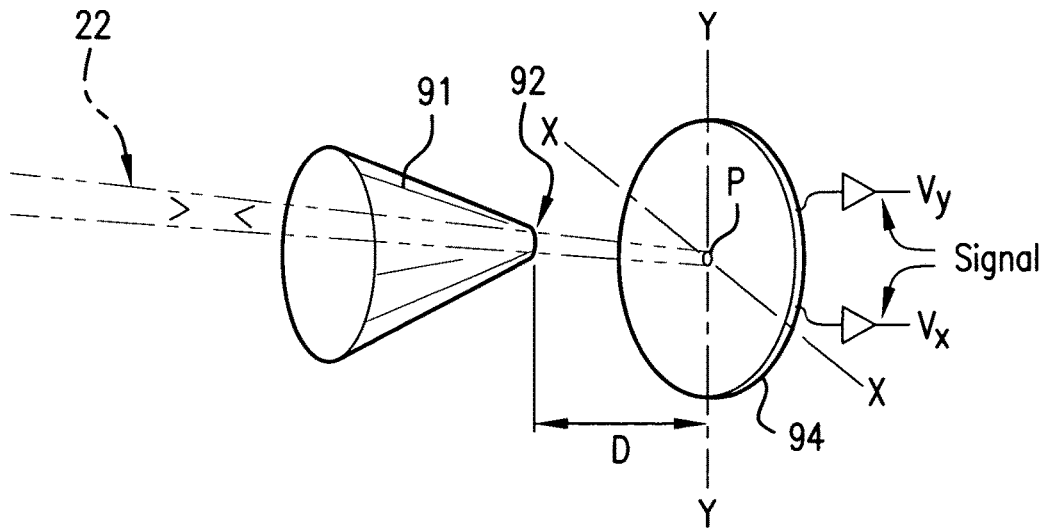
FIG. 4 is a schematic diagram illustrating an exemplary pitch and yaw measurement system of the present invention.

FIG. 4 illustrates an exemplary technique for determining the pitch and yaw orientation of the measurement instrument according to one embodiment of the present invention. Laser beam 22 from tracking unit 20 (see FIG. 2) strikes retro-reflector 91 of optical target 90. At least a part of laser beam 22 passing through aperture 92 of retro-reflector 91 can be detected by laser light sensor 94. Retro-reflector 91 may be of hollow or solid construction. Apex 92 allows at least part of laser beam 22 to go through to fall or focus onto laser light sensor 94, which can be a photodetector or a CCD array sensor. Not shown in FIG. 4 is the filter/attenuator 96.

As is known to those skilled in the art, a hollow retro-reflector includes three mirrors which are positioned perpendicular to each other. An apex is formed at the common extremity of the mirrors and, preferably, a small hole located at the apex forms an aperture. The aperture allows at least part of laser beam to pass through the retro-reflector and fall on or focus onto the laser light sensor. If a solid retro-reflector is used, a small flat surface near the apex is polished to create a way to allow at least part of laser beam to pass through to fall or focus onto laser light sensor. The flat surface behaves similarly to an aperture. Reference is made to Applicant's U.S. Pat. No. 7,230,689 for a fuller discussion of these retro-reflectors.

Retro-reflector 91 and laser light sensor 94 are configured to measure the pitch (displacement along axis y-y, FIG. 4) and yaw (displacement along axis x-x, FIG. 4) movements or orientations of the measurement instrument 50. By calculating the magnitude of vectors $V_y$ and $V_x$ and knowing the separation distance D between aperture 92 and the surface of light sensor 94, the change in angular orientation of retro-reflector 91 with respect to the laser beam 22 can be determined. The orientation of the axes x-x and y-y in FIG. 4 has been changed relative to the orientation shown in FIG. 2, for greater clarity of discussion.

FIG. 4 also schematically illustrates how a yaw movement associated with optical target 90 can be measured. When retro-reflector 91 of optical target 90 indicates no yaw movement, laser beam 22 goes through aperture 92 and is detected by laser light sensor 94 at an origin point or reference point P. However, any yaw movement of retro-reflector 91 would result in laser beam 22 being detected by laser light sensor 94 at locations other than reference point P, for example, to the right or left of point P along the direction of axis x-x. This displacement is represented by the vector $V_x$. Preferably, retro-reflector 91 and laser light sensor 94 are configured to detect a large range of yaw movements, up to at least about 40 degrees, depending on size and other factors.

Similarly, the pitch movement of optical target 90 can be detected and measured using retro-reflector 91 and laser light sensor 94. At a zero pitch movement, laser beam 22 goes through aperture 92 and is detected by laser light sensor 94 at reference point P. If there is a pitch movement, a different part of laser light sensor 94, either above or below reference point P in the direction of axis y-y, would detect the laser beam light. This displacement is represented by the vector $V_y$.

As noted above, laser light sensor 94 can be a photodetector. In an alternate embodiment of the invention, a CCD array sensor can be used as laser light sensor. As known in the art, a CCD array sensor can include multiple pixels arranged in an array. Digital output from the CCD array sensor can be processed by a repeater (not shown). The CCD array sensor is used to detect pitch and/or yaw movements of the optical target. The use of CCD array sensors for detection of light is known in the art, for example, in digital cameras. Therefore, no further description is believed to be necessary.

Use of retro-reflector 91 and laser light sensor 94 in optical target 90 as described above provides several advantages. For example, the measurement instrument with the optical target 90 thereon and incorporating retro-reflector 91 can be more functional in an upside-down orientation, which is otherwise not possible.

The output from laser light sensor 94 is provided to control unit 40 of FIGS. 1 and 2. The control unit can be a computer, microprocessor, program, or other combination of hardware and software capable of processing information received from laser light sensor 94 as well as the information from the other components incorporated into the measurement instrument 50.

The combination of the roll, the pitch and the yaw measurements made by the instrument 50, along with the spherical coordinates made by the tracking unit 20, allows the tracking system to obtain the six-dimensional tracking of the target.

It can readily be appreciated that the optical target described above can be utilized with equipment other than the integrated probe and scanner measurement device. While the flexibility afforded by the optical target with its full 360-degree movement capabilities in pitch, yaw and roll provide distinct advantages in a portable, hand-held measurement device, the optical target of the present invention can advantageously be used where it is desired to monitor movement of up to 6-degrees of freedom. The optical target, for example, can be fixedly attached to any object to allow monitoring of the object. Alternatively, the optical target can be attached to a movable device and the position of that device monitored.

Figure 5:
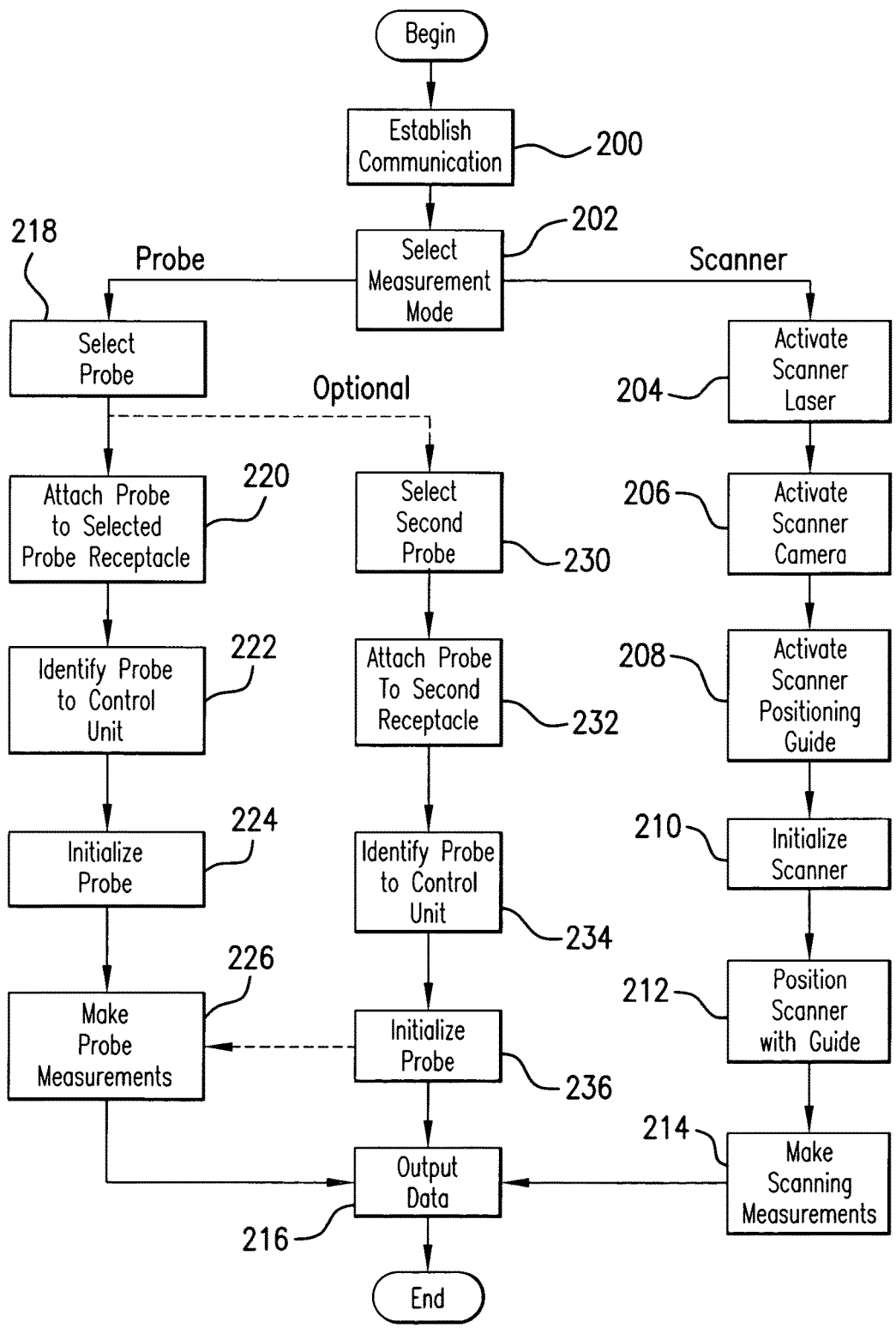
FIG. 5 is a schematic diagram illustrating an exemplary method of making measurements with the present invention.

FIG. 5 is a flowchart schematically illustrating an exemplary method of taking measurements with the measurement instrument of the present invention.

The method begins with the establishment of communication between the laser tracking unit 20 and the measurement instrument 50 (step 200), including orienting the optical target 90 toward the tracking unit such that the laser beam therefrom is received by the retro-reflector of the optical target 90. Next, the mode of making the measurements is selected (step 202), between the scanning mode or the probing mode. If the scanning mode is selected, the scanner laser 56 (step 204), scanner camera 60 (step 206) and light source 63 of the optical guide are activated (step 208). The measurement instrument 50 is initialized at step 210, and with the scanner positioning beam 69 aimed toward the object to be measured, the instrument is positioned relative to the object until the positioning beam just intersects the projected line formed on the object by the beam fan directed toward the object by the scanner laser 56 (step 212). This establishes the optimal separation distance between the measurement instrument and the object to be measured. The measurement instrument is activated by pressing trigger button 74, and the instrument is moved along the object to be measured (step 214). During scanning measurement the positioning beam continues to be used to assist in maintaining the optimal separation distance. Next, the measurement data is transmitted to the control unit for processing (216).

If, in the measurement mode selection (step 202) the probing mode is selected, then the desired probe configuration is selected (step 218) and attached to at least one of the two probe receptacles 70 and 76 (step 220) on the measurement instrument 50. Optionally, another probe having the same configuration or having another configuration is selected (step 230) and attached to the remaining probe receptacle (step 232). Whichever probing configuration is selected, and for each configuration the selected probe is identified to the control unit 40 after it is attached to the respective receptacle (steps 222, 234). The probe is then initialized (steps 224, 236) in preparation for making measurements. The measurement instrument is activated by pressing the trigger button and measurement made with the probe (step 226). Next, the measurement data is transmitted to the control unit for further processing (step 216). Probing measurement is repeated as necessary to complete the measurement session by going back to step 226.

During the measurement session, it may be desirable to switch between the probing mode of measurement and the scanning mode, depending upon the configuration and requirements of the object to be measured. Rapid interchange between the separate measurement modes is made possible and facilitated by the present invention with its integrated probing and scanning modes of operation. Thus, it may be desirable to scan an object to quickly obtain the measurement data. Then, during the same measurement session it may be necessary or desirable to switch to the probing mode to obtain accurate measurement data of areas or features on the object for which measurements with the scanner may not be possible or may not yield the best data. Examples include hidden points, detailed features, holes, deep recesses and separation or spacing gaps.

Whether the measurements are obtained with a probe or the scanner, the ability of the present invention to operate with full 360° angular working range in pitch, yaw and roll provides the measurement instrument with the capability and flexibility of making measurements in object geometry and surface topography which otherwise could not be made with other devices of known design.

While the present invention has the greatest utility as a portable, hand-held device adapted to permit a user to make measurements which may otherwise be difficult or impossible, it is understood that the invention can be coupled to a robot or robotic arm of a laser tracking system and operate to enhance the measurement capabilities of the system Many modifications and other embodiments of the invention will be apparent to one skilled in the art having the benefit of the teachings presented in the foregoing description and the associated drawings. Therefore, it is understood that the invention is not to be limited to the specific embodiments disclosed, and that other modifications and embodiments are intended to be included within the scope of the appended claims.

What is claimed:

1. A measurement instrument having selectable probe-type measuring capability and scanning measuring capability integrated into the instrument, comprising:
   a support structure;
   a scanning measuring means on said support structure;
   first receptive means on said support structure for removably mounting a contact-type measuring probe;
   at least one second receptive means on said support structure and adapted for removably mounting a contact-type measuring probe, said second receptive means located at a position different from said first receptive means;
   control means for selectively making measurement with said scanning measuring means or said measuring probe; and
   an optical target coupled to said support structure, said optical target adapted for communicating with a remote source of coherent light and capable of movement with said support structure about orthogonal pitch, yaw and roll axes to provide information on the position of said target.

2. The measurement instrument of claim 1, further comprising a plurality of sensors associated with the pitch, yaw and roll axes of movement of said optical target and adapted to provide output indicating the position of said optical target and measurement instrument, said optical target being capable of full 360° of motion about each of said axes of movement, and wherein said scanning measuring means comprises:
   a scanning light source disposed at a first position on said support structure; and
   a light receiving means for receiving the light from said scanning light source reflected from the object being measured.

3. The measurement instrument of claim 1 or 2, further comprising an optical guide means disposed on said support structure and adapted to provide an indication of the optimum separation distance between the instrument and the measured object.

4. The measurement instrument of claim 1 or 2, further comprising means on said first and said second receptive means adapted to obtain information provided on said contact-type measuring probe and used to calibrate the instrument for the installed probe.

5. The measurement instrument of claim 1 or 2, further comprising means to turn off the scanning measuring means upon the mounting of a measuring probe in said first or said second receptive means.

6. A method for making measurements in a multi-dimensional measuring system having a tracker with a source of laser light, a control unit and an optical target coupled to a measuring device and adapted for communication with the tracker, and a plurality of sensors associated with the pitch, yaw and roll axes of movement of said optical target and operative to provide output indicating the position of said optical target, said optical target being capable of full 360° of motion about each of said axes of movement, the method comprising:
   establishing communication between the optical target and the tracker;
   selecting the desired mode of making the measurement on the measuring device having integrated selectable capability of measuring with a measuring scanner or with a contact-type probe;
   activating a scanner laser and scanner camera when the scanner mode is selected;
   selectively mounting the probe in a first position or a second position on the device when the probe mode is selected, the second position being different from the first position;
   initializing the measuring device in the scanner mode or the contact-type probe mode;
   directing the scanner laser toward the object being measured or contacting the object with the probe;
   making measurement with the device in the scanner mode or the contact-type probe mode by activating a control mechanism on the device;
   maintaining communication between the optical target and the tracker as the measuring device moves unrestricted about the axes of movement during measurement; and
   providing measurement data to the control unit.

7. The method of claim 6, wherein:
   the step of selecting the desired mode of making the measurement includes selecting a contact-type probe of a second configuration;
   mounting the probe in the second position;
   initializing the device with the probe in the second position; and
   inactivating the scanner laser and the scanner camera.

8. The method of claim 6 or 7, wherein the step of mounting the probe in either the first or the second position inactivates the scanner laser and the scanner camera.

9. The method of claim 6 or 7, further identifying the probe to the control unit prior to initializing the device.

10. The method of claim 9, wherein identification of the probe is achieved upon mounting of the probe and probe-identifying data on the probe is read by the device.

* * * * *